(12) United States Patent
Jevans et al.

(10) Patent No.: US 11,836,718 B2
(45) Date of Patent: Dec. 5, 2023

(54) SYSTEMS AND METHODS FOR CRYPTO CURRENCY AUTOMATED TRANSACTION FLOW DETECTION

(71) Applicant: CipherTrace, Inc., Menlo Park, CA (US)

(72) Inventors: David Jevans, Menlo Park, CA (US); Shannon Holland, Los Gatos, CA (US); Stephen Ryan, Virginia Beach, VA (US)

(73) Assignee: CipherTrace, Inc., Menlo Park, CA (US)

( * ) Notice: Subject to any disclaimer, the term of this patent is extended or adjusted under 35 U.S.C. 154(b) by 284 days.

(21) Appl. No.: 16/416,091

(22) Filed: May 17, 2019

(65) Prior Publication Data
US 2019/0370797 A1    Dec. 5, 2019

Related U.S. Application Data

(60) Provisional application No. 62/678,887, filed on May 31, 2018.

(51) Int. Cl.
*G06Q 20/38* (2012.01)
*G06F 16/21* (2019.01)
(Continued)

(52) U.S. Cl.
CPC ......... *G06Q 20/389* (2013.01); *G06F 16/215* (2019.01); *G06Q 20/0658* (2013.01);
(Continued)

(58) Field of Classification Search
CPC ... G06Q 20/38–40975; G06Q 20/0658; G06Q 20/065; G06Q 20/08; G06Q 2220/00; G06F 16/215; H04L 9/50; H04L 2209/56
(Continued)

(56) References Cited

U.S. PATENT DOCUMENTS

| 9,298,806 | B1 | 3/2016 | Vessenes et al. |
| 9,635,000 | B1 | 4/2017 | Muftic |

(Continued)

FOREIGN PATENT DOCUMENTS

| CN | 104320262 A | 1/2015 |
| CN | 107317725 A * | 11/2017 |

(Continued)

OTHER PUBLICATIONS

Li Shaoheng CN 107317725 A The method for visualizing and system of a kind of block chain (English Translation from IP.com) Published on Nov. 3, 2017 (Year: 2017).*

(Continued)

*Primary Examiner* — James D Nigh
(74) *Attorney, Agent, or Firm* — Barta, Jones & Foley, PLLC

(57) ABSTRACT

Systems and methods for automatically searching crypto currency transaction paths and discovering transaction flows between individuals and identifiable services, trim or prune out irrelevant transactions and addresses, and present the relevant information as an identifiable transaction chain are provided herein. In various embodiments the present technology dramatically increases the productivity of investigators and auditors researching crypto currency transactions.

20 Claims, 5 Drawing Sheets

(51) Int. Cl.
  *G06Q 20/06* (2012.01)
  *G06Q 20/40* (2012.01)
  *H04L 9/00* (2022.01)
  *G06Q 20/08* (2012.01)
  *G06F 16/215* (2019.01)

(52) U.S. Cl.
  CPC ....... *G06Q 20/405* (2013.01); *G06Q 20/4016* (2013.01); *G06Q 2220/00* (2013.01)

(58) Field of Classification Search
  USPC .......................................................... 705/75
  See application file for complete search history.

(56) References Cited

U.S. PATENT DOCUMENTS

| | | | |
|---|---|---|---|
| 10,171,476 | B2 | 1/2019 | Khan |
| 10,891,694 | B1 | 1/2021 | Leise et al. |
| 2006/0184528 | A1 | 8/2006 | Rodeh |
| 2006/0248016 | A1 | 11/2006 | Ginter et al. |
| 2011/0251951 | A1 | 10/2011 | Kolkowitz et al. |
| 2013/0018796 | A1 | 1/2013 | Kolhatkar et al. |
| 2014/0047544 | A1 | 2/2014 | Jakobsson |
| 2014/0059455 | A1* | 2/2014 | Abdukalykov ........ G06Q 10/10 715/764 |
| 2015/0032625 | A1 | 1/2015 | Dill et al. |
| 2015/0318995 | A1 | 11/2015 | Leggette et al. |
| 2015/0332283 | A1 | 11/2015 | Witchey |
| 2015/0381637 | A1 | 12/2015 | Raff et al. |
| 2016/0012465 | A1 | 1/2016 | Sharp |
| 2016/0071108 | A1 | 3/2016 | Caldera et al. |
| 2016/0180466 | A1* | 6/2016 | Caldwell ............... G06Q 40/06 705/17 |
| 2016/0217436 | A1* | 7/2016 | Brama ............... G06Q 20/3827 |
| 2016/0261690 | A1 | 9/2016 | Ford |
| 2016/0283920 | A1 | 9/2016 | Fisher et al. |
| 2016/0283941 | A1 | 9/2016 | Andrade |
| 2016/0300227 | A1* | 10/2016 | Subhedar ............. G06Q 20/384 |
| 2016/0300234 | A1 | 10/2016 | Moss-Pultz et al. |
| 2016/0330027 | A1 | 11/2016 | Ebrahimi |
| 2016/0342994 | A1 | 11/2016 | Davis |
| 2017/0005804 | A1 | 1/2017 | Zinder |
| 2017/0011460 | A1 | 1/2017 | Molinari et al. |
| 2017/0031676 | A1 | 2/2017 | Cecchetti et al. |
| 2017/0034197 | A1 | 2/2017 | Daniel et al. |
| 2017/0093830 | A1 | 3/2017 | Wuehler |
| 2017/0111175 | A1 | 4/2017 | Oberhauser et al. |
| 2017/0132620 | A1 | 5/2017 | Miller et al. |
| 2017/0132635 | A1 | 5/2017 | Caldera |
| 2017/0132636 | A1* | 5/2017 | Caldera ............. G06Q 20/4016 |
| 2017/0206604 | A1 | 7/2017 | Al-Masoud |
| 2017/0214701 | A1 | 7/2017 | Hasan |
| 2017/0236094 | A1 | 8/2017 | Shah |
| 2017/0250972 | A1 | 8/2017 | Ronda et al. |
| 2017/0270534 | A1 | 9/2017 | Zoldi et al. |
| 2017/0293669 | A1 | 10/2017 | Madhavan et al. |
| 2017/0316390 | A1 | 11/2017 | Smith et al. |
| 2017/0330180 | A1 | 11/2017 | Song et al. |
| 2017/0344988 | A1 | 11/2017 | Cusden et al. |
| 2017/0352116 | A1 | 12/2017 | Pierce et al. |
| 2017/0366348 | A1 | 12/2017 | Weimer et al. |
| 2018/0006826 | A1 | 1/2018 | Smith et al. |
| 2018/0018723 | A1* | 1/2018 | Nagla ..................... H04L 63/08 |
| 2018/0039667 | A1 | 2/2018 | Pierce et al. |
| 2018/0082256 | A1 | 3/2018 | Tummuru et al. |
| 2018/0089256 | A1 | 3/2018 | Wright, Sr. |
| 2018/0109541 | A1 | 4/2018 | Gleichauf |
| 2018/0137306 | A1 | 5/2018 | Brady et al. |
| 2018/0183606 | A1 | 6/2018 | High et al. |
| 2018/0211038 | A1 | 7/2018 | Breiman et al. |
| 2018/0219671 | A1 | 8/2018 | Velissarios et al. |
| 2018/0240107 | A1* | 8/2018 | Andrade ............ G06Q 20/4016 |
| 2018/0253702 | A1 | 9/2018 | Dowding |
| 2018/0276666 | A1 | 9/2018 | Haldenby et al. |
| 2018/0330385 | A1 | 11/2018 | Johnson et al. |
| 2018/0331835 | A1 | 11/2018 | Jackson |
| 2019/0018888 | A1 | 1/2019 | Madisetti et al. |
| 2019/0057362 | A1 | 2/2019 | Wright |
| 2019/0081961 | A1 | 3/2019 | Bansal |
| 2019/0132350 | A1 | 5/2019 | Smith et al. |
| 2019/0156301 | A1 | 5/2019 | Bentov et al. |
| 2019/0164156 | A1 | 5/2019 | Lindemann |
| 2019/0196899 | A1* | 6/2019 | Sylvester, II ........... H04L 63/08 |
| 2019/0199535 | A1 | 6/2019 | Falk |
| 2019/0229892 | A1 | 7/2019 | Jevans |
| 2019/0245699 | A1 | 8/2019 | Irwan et al. |
| 2019/0279215 | A1 | 9/2019 | Kuchar |
| 2019/0354725 | A1 | 11/2019 | Lowagie |
| 2020/0160344 | A1 | 5/2020 | Jevans et al. |
| 2020/0162485 | A1 | 5/2020 | Jevans et al. |
| 2020/0167779 | A1 | 5/2020 | Carver et al. |
| 2020/0351278 | A9 | 11/2020 | Jevans et al. |
| 2021/0006399 | A1 | 1/2021 | Lee |

FOREIGN PATENT DOCUMENTS

| | | | |
|---|---|---|---|
| WO | WO2019071458 | A1 | 4/2019 |
| WO | WO2019144042 | A1 | 7/2019 |
| WO | WO2019231772 | A1 | 12/2019 |
| WO | WO2020010279 | A1 | 1/2020 |
| WO | WO2020106638 | A1 | 5/2020 |
| WO | WO2020106639 | A1 | 5/2020 |

OTHER PUBLICATIONS

"Bitcoin Transaction Graph Analysis", arXiv:1502.01657v1, Feb. 5, 2015, 8 pages (Year: 2015).*

Biryukov, A., Khovratovich, D., and Pustogarov, I. Deanonymisation of clients in Bitcoin P2P network. In Proceedings of the 2014 ACM SIGSAC Conference on Computer and Communications Security (2014), ACM, pp. 15-29., 15 pages.

M. Fleder, M. S. Kester, S. Pillai, Bitcoin Transaction Graph Analysis, CoRR, vol. abs/1502.01657, 2015, [online] Available: http://arxiv.org/abs/1502.01657, 8 pages.

M. Moser, R. Bohme, D. Breuker, "An inquiry into money laundering tools in the Bitcoin ecosystem", IEEE eCrime Researchers Summit (eCRS), 2013, 14 pages.

S. Meiklejohn, M. Pomarole, G. Jordan, K. Levchenko, D. McCoy, G. M. Voelker, S. Savage, "A Fistful of Bitcoins: Characterizing Payments Among Men with No Names", IMC, 2013, 13 pages.

F. Reid and M. Harrigan, "An analysis of anonymity in the Bitcoin system," In Privacy, security, risk and trust (PASSAT), 2011 IEEE Third Internatiojn Conference on Social Computing (SOCIALCOM). IEEE, 2011, pp. 1318-1326.

"International Search Report" and "Written Opinion of the International Searching Authority," Patent Cooperation Treaty Application No. PCT/US2019/014346, dated Apr. 22, 2019, 6 pages.

"International Search Report" and "Written Opinion of the International Searching Authority," Patent Cooperation Treaty Application No. PCT/US2019/033399, dated Aug. 1, 2019, 8 pages.

Chaum, David Lee, "Computer Systems Established, Maintained, and Trusted by Mutually Suspicious Groups," Dissertation, Department of Computer Science, University of California, Berkeley, May 22, 1982, 96 pages.

"International Search Report" and "Written Opinion of the International Searching Authority," Patent Cooperation Treaty Application No. PCT/US2019/062047, dated Jan. 24, 2020, 13 pages.

"International Search Report" and "Written Opinion of the International Searching Authority," Patent Cooperation Treaty Application No. PCT/US2019/062049, dated Jan. 27, 2020, 10 pages.

Kharraz Amin et al., "Cutting the Gordian Knot: A Look under the Hood of Ransomware Attacks"; International Conference on Detection of Intrusions and Malware, and Vulnerability Assessment, Jun. 23, 2015 [retrieved Jan. 5, 2020]; Retrieved from the internet: <http://193.55.114.1/docs/dimva15_ransomware.pdf>, 28 pages.

Ye et al., "Alt-Coin Traceability," May 18, 2020 [retrieved May 25, 2021]; Retrieved from the internet: <https://eprint.iacr.org/2020/593>, 24 pages.

(56) References Cited

OTHER PUBLICATIONS

Van Sabergahen, "CryptoNote v 2.0," Oct. 17, 2013 [retrieved May 25, 2021]; Retrieved from the internet: <https://www.google.com/url?sa=t&rct=j&q=&esrc=s&source=web&cd=&ved=2ahUKEwjKnqCY1eXwAhUFCjQIHXcOD_4QFjAAehQIAxAD&url=https%3A%2F%2Fbytecoin.org%2Fold%2Fwitepapre.pdf&usg=AOvVaw2WPuLQEPBjsZIPvUdROfmW>, 20 pages.

Biryukov et al, "Deanonymisation of clients in Bitcoin P2P network," Jul. 5, 2014, [retrieved May 25, 2021]; Retrieved from the internet: <https://arxiv.org/abs/1405.74183>, 15 pages.

Fleder et al., "Bitcoin Transaction Graph Analysis," Feb. 5, 2015 [retrieved May 25, 2021]; Retrieved from the internet: <https://arxiv.org/abs/1502.01657>, 8 pages.

Möser et al., "An Inquiry into Money Laundering Tools in the Bitcoin Ecosystem," 2013 [retrieved May 25, 2021]; Retrieved from the internet: <https://www.google.com/url?sa=t&rct=j&q=&esrc=s&source=web&cd=&ved=2ahUKEwjbanL1uXwAhU3JjQIHZDLCV0QFjADegQICBAD&url=https%3A%2F%2Fmaltemoeser.de%2Fpaper%2Fmoney-laundering.pdf&usg=AOvVaw0ta6LuCqsYGaknzlNijsD>, 14 pages.

Meiklejohn et al., "A Fistful of Bitcoins: Characterizing Payments Among Men with No Names," 2013 [retrieved May 25, 2021]; Retrieved from the internet: <https://www.google.com/url?sa=t&rct=j&q=&esrc=s&source=web&cd=&ved=2ahUKEwjahNqI1-XwAhUKGDQIHecoC_0QFjACegQIAXAD&url=https%3A%2F%2Fcseweb.ucsd.edu%2F~smeiklejohn%2Ffiles%2Fimc13.pdf&usg=AOvVaw19IMVZQrGBhey605n-ftFH>, 13 pages.

Reid et al., "An Analysis of Anonymity in the Bitcoin System," Jul. 22, 2011 [retrieved May 25, 2021]; Retrieved from the internet: <https://arxiv.org/abs/1107.4524>, 30 pages.

Welsh, Noel, "Bandit Algorithms ContinuedL UCB1," Nov. 9, 2010; 17 pages.

J2kun, "Optimism in the Face of Uncertainty: the UCB1 Algorithm," [online] Oct. 28, 2013 [retrieved Jun. 9, 2021]; Retrieved from the internet: <https://jeremykun.com/2013/10/28/optimism-in-the-face-of-uncertainty-the-ucb1-algorithm/>, 17 pages.

Prasad, Aditya, "Lessons From Implementing AlphaZero," [online] Jun. 5, 2018 [retrieved Jun. 9, 2021]; Retrieved from the internet: <https://medium.com/oracledeve/lessons-from-implementing-alphazero-7e36e9054191>, 4 pages.

* cited by examiner

SYSTEMS AND METHODS FOR CRYPTO CURRENCY AUTOMATED TRANSACTION FLOW DETECTION

CROSS REFERENCE TO RELATED APPLICATIONS

This application claims the priority benefit of U.S. Provisional Patent Application Ser. No. 62/678,887 filed on May 31, 2018 and titled "Crypto Currency Automated Transaction Flow Detection," which is hereby incorporated by reference in its entirety for all purposes.

FIELD OF THE TECHNOLOGY

Embodiments of the present technology relate to systems and methods to automatically search crypto currency transaction paths and to discover transaction flows between individuals and identifiable services, trim or prune out irrelevant transactions and addresses, and present the relevant information as a "transaction chain". In particular, the present technology relates to increasing the productivity of investigators and auditors researching crypto currency transactions.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Virtual currencies (also referenced as crypto currencies, electronic currencies, and digital currencies) are becoming widespread across the globe. Crypto currencies were invented in 1983 with the seminal whitepaper from David Chaum describing how cryptography could be used to transfer measures of value between persons over computer networks.

In 2009, the Bitcoin protocol and ideology was introduced. This electronic currency took hold and has expanded into a global phenomenon.

While there are countless legitimate uses for crypto currency, cybercriminals are capitalizing on the decentralization and anonymization offered by digital currencies. Anonymity or "pseudonymity," coupled with the rapid and irreversible ability to transfer funds, facilitates financially-driven criminal activities, including money laundering, ransomware, extortion, drug trafficking, and live-streams for illicit internet site—especially those engaged in child sexual exploitation. Criminals are capitalizing on the decentralization and anonymous payment mechanisms of virtual currencies and thus posing serious challenges for law enforcement efforts to recognize, analyze, trace criminal activity and seize their profits. Therefore, a need exists to automatically search crypto currency transaction paths and to discover transaction flows between individuals and identifiable services, trim or prune out irrelevant transactions and addresses, and present the relevant information as a "transaction chain" to identify cybercriminals.

SUMMARY

In some embodiments the present disclosure is directed to a system of one or more computers which can be configured to perform particular operations or actions by virtue of having software, firmware, hardware, or a combination thereof installed on the system that in operation causes or cause the system to perform actions and/or method steps as described herein.

According to some embodiments the present technology is directed to methods and systems for automatically searching crypto currency transaction paths for a transaction chain with an identifiable address. In various embodiments the methods comprising: (a) receiving a request to search a crypto currency record, the crypto currency record comprising one or more of an address and a transaction; (b) automatically searching forward transactions and backwards transactions from the crypto currency record; (c) determining transaction flows between a plurality of individuals and a plurality of services with identifiable addresses and unidentifiable addresses using the forward transactions and the backwards transactions from the crypto currency record; (d) identifying an known address of the identifiable addresses and the unidentifiable addresses using identifiable information; (e) removing irrelevant individuals and services of the plurality of individuals and the plurality of services based on the known address; and (f) displaying the known address in an identifiable transaction chain using the identifiable addresses and the unidentifiable addresses.

In some embodiments the present technology the crypto currency record further comprises one or more of a time stamp, a value amount being transacted, a list of one or more senders of funds for the value amount being transacted, and a list of one or more receivers of funds for the value amount being transacted.

In various embodiments the present technology the identifiable information comprises one or more of: identification data about at least one of an owner and an operator of a payment address, a cluster identifier associated with one or more addresses, identification data of a payment service or exchange associated with an address, identification data of a gambling site or service, identification data of an anonymization service, identification data of a crypto currency retailer, identification data of an address or transaction that is being researched by another investigator, identification data of a potential criminal actor, and identification data of an online account associated with an address or transaction.

In some embodiments the present technology the identifiable information comprises: an Internet location indicating where at least one of the address and the transaction is associated. In various embodiments the Internet location indicating where at least one of the address and the transaction is associated comprises one or more of: data identifying general website data, data identifying a social media website, and data identifying a dark web market where at least one of the address and the transaction is associated.

In various embodiments the present technology the automatically searching the forward transactions and the backwards transactions from the crypto currency record comprises a transaction restriction, the transaction restriction reducing computing power for the automatically searching the forward transactions and the backwards transactions. In some embodiments the transaction restriction is at least one of a number of transactions, a time period, and a transaction value range.

In various embodiments the present technology the displaying the known address in the identifiable transaction chain comprises displaying a visual icon of the known address.

Some embodiments the present technology further comprise storing the identifiable transaction chain in a cloud-based normative data storage database; accessing the cloud-based normative data storage database having normative data for the identifiable transaction chain, risk ratios, and recommendations; comparing the identifying the known address of the identifiable addresses and the unidentifiable addresses to normative data for the identifiable transaction chain, risk ratios, and recommendations; and based on the comparing, selecting a recommendation of the recommendations accessed from the cloud-based normative data storage database.

BRIEF DESCRIPTION OF THE DRAWINGS

Certain embodiments of the present technology are illustrated by the accompanying figures. It will be understood that the figures are not necessarily to scale. It will be understood that the technology is not necessarily limited to the particular embodiments illustrated herein.

DETAILED DESCRIPTION

Figure 1:
FIG. 1 illustrates a transaction chain graph showing crypto currency flows that are difficult to understand and requires manual investigation to identify a known address.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices may be shown in block diagram form only in order to avoid obscuring the disclosure. It should be understood, that the disclosed embodiments are merely exemplary of the invention, which may be embodied in multiple forms. Those details disclosed herein are not to be interpreted in any form as limiting, but as the basis for the claims.

Embodiments of the present technology comprise a mechanism for forensic technologies needed for U.S. law enforcement, regulators, and the intelligence community to understand how virtual currencies operate, how to identify the wide array of virtual currencies, and to monitor and track criminal activities that use crypto currency systems.

Crypto currencies have the following qualities that are discussed in turn below. Decentralized currency. For example, an electronic currency is not tied to a bank, or even a flat currency (e.g., United States Dollars (USD). Electronic currency can float and has its own governance (or lack thereof).

Fixed inflation rate. For example, the inflation rate of Bitcoin is fixed and is not dependent on quarterly meetings of a regulatory body (e.g., the Board of Governors of the Federal Reserve System). Electronic currency has is a linear and predictable inflation. Given price increases in Bitcoin, it can be argued that Bitcoin is actually a deflationary currency.

Invented during the Global Financial Crisis. For example, Bitcoin was invented in 2009 during a global meltdown of large financial institutions, which gives Bitcoin credibility and an almost fanatical following.

Pseudonymous. For example, much is made of Bitcoin's alleged anonymous nature, especially for illegal transactions. Many illegal services, accessed over Tor (i.e., free and open-source software for enabling anonymous communication) hidden services, accept electronic currencies (e.g., Bitcoin, Litecoin, and Darkcoin) for anonymous payments. The fact is that Bitcoin, along with other virtual currencies, is pseudonymous and not truly anonymous. Embodiments of the present technology bring more transparency to virtual currency (e.g., Bitcoin) transactions.

Miners get rewarded. For example, the nature of the distributed blockchain through mining and mining rewards has created a business for transaction confirmation that is between one-million-dollars and four-million-dollars per day, depending on the price of Bitcoin. This market of between three-hundred-and-sixty-million-dollars and one-billion-and-three-hundred-millions-dollars per year encourages miners to invest in the network.

Many business opportunities. For example, local exchanges. For instance, Bitcoin creates business opportunities for businesses in many countries to act as currency exchanges. This further fuels crypto currencies and the economics that drive them. For example, in March 2015 Hawala (i.e., money is paid to an agent who then instructs a remote associate to pay the final recipient) type systems emerged. For instance, ABRA (e.g., ABRA operates an easy to use application that allows users to buy, sell, store, and invest in cryptocurrencies, plus manage all crypto investments, in one place. Crypto currencies create opportunities for businesses that enable unbanked users to perform cross-border transactions, but also open up the possibility of untracked terrorist financing.

Payment instrument. For example, Bitcoin is a legitimate payment instrument and is accepted by major merchants including Apple®, Microsoft®, Target®, PayPal®, Zappos®, Wordpress®, Home Depot®, Zyng®, and Tesla® among many others.

Investment instrument. For example, Bitcoin has surged in value from two-dollars per coin in 2011 to over two-hundred-and-fifty-dollars per coin in 2015, making it one of the world's best investment instruments. Some investors were lucky enough to sell Bitcoin at over one-thousand-dollars per coin in 2014. The investment potential of Bitcoin cannot be underestimated.

There are now over four-hundred crypto currencies in operation, including Bitcoin, Ethereum, Monero, Zcash, Litecoin, and Dogecoin among many others.

Various embodiments of the present technology provide systems and methods for searching forward and backward in transaction time from a crypto currency payment address or transaction, or a pair of a transaction and address. Systems and methods of the present technology search transaction chains and provide a list of transaction chains that terminate with an identifiable address or transaction.

In various embodiments a transaction chain is a list of addresses with associated transaction identifiers between the addresses of the list.

Embodiments of the present technology represent a transaction chain as a graphical view (i.e., a transaction chain graph) of addresses and the connecting transactions between them. For example, transaction records encompass data and time, a value amount being transacted, a list of one or more senders of funds in the transaction, and a list of one or more receivers of funds in the transaction.

In various embodiments an identifiable address is an address with information that differentiates the identifiable address from an unknown payment address. An identifiable transaction is a transaction with information that differentiates the identifiable transaction from an unknown transaction. In various embodiments the information may include: identity information about the owner or operator of a payment address, a cluster identifier (i.e., "digital wallet") associated with one or more addresses, identification of a payment service or exchange associated with an address, identification of a gambling site or service, identification of an anonymization service, identification of a crypto currency retailer, identification of an address or transaction that is being researched by another investigator, identification of a potential criminal actor, identification of an address or transaction with a website, social media site, dark web market, or other location on the Internet where at least one of the address and the transaction is associated or published, identification of an online account associated with an address or transaction, and the like.

Embodiments of the present technology search forward and backward from an address or an address and transaction pair, or from a transaction. Systems and methods follow the monetary trail by iterating through all addresses sending to and receiving from a transaction, and then moving forward through the transaction history for each transaction to find the next set of addresses. Embodiments of the present technology analyze all the transactions from those addresses after the time period of the previous transaction, and continue this process until an identifiable address or transaction is found.

In various embodiments, once an identifiable address or transaction is found, the identifiable address or transaction is added to a list of transaction chains that can be presented to a user or into an analysis or storage system. This process continues across all related transactions and addresses, and can create a list of transaction chains that can be analyzed. In one embodiment transactions and addresses are represented in a block chain. In another embodiment, transactions and addresses are represented in a database.

In various embodiments of the present technology the transaction analysis process stops when an identifiable address or transaction is found. Alternatively, the transaction analysis process can continue after an identifiable address or transaction is determined. In some instances multiple transaction analysis processes can proceed in parallel. In various instances transaction analysis is done recursively or linearly.

In some embodiments of the present technology transaction analysis is bounded to only operate on transactions a certain number of transactions before or after the transaction or address in question. Transaction analysis can also be bounded to only operate on transactions within a specified time window before or after a transaction being investigated. For example, only search transactions within six months before and after a given date or the date of a given transactions.

In various embodiments transaction chains are displayed graphically. In some embodiments transaction chains have a graphical identifier or identifiers. The graphical identifier or identifiers show for addresses and transactions that have specific identifiable information.

In various embodiments of the present technology an address or transaction has a visual icon representation if the address or the transaction is being investigated by other users or is associated with an identifiable individual or entity.

According to exemplary embodiments an example user of the present technology is a law enforcement investigator that has one or more bitcoin crypto currency addresses or transactions. The law enforcement investigator enters the address(es) and/or transaction(s) using systems and methods of the present technology that is a software program running on a computer or is accessed over the Internet. The law enforcement investigator optionally informs the system whether the search should be for where the money flows to, or flows from, or both. The law enforcement investigator may optionally enter one or more of the following: time windows to bound the search, a number of transactions forward or backward to bound the search, or enters that transaction value range.

In various embodiments the present technology begins an automated search using the address(es) and/or transaction(s) and bounding parameters. The algorithm may search hundreds or millions of transaction paths. Whenever an address or transaction is found with identifiable information, a linear transaction chain is created and stored in a database or file on a computer. After the search is completed, or periodically during the search process, the investigator is notified that there are search results available. One way to perform this notification is to send the investigator an email or mobile text message regarding the results of the algorithm.

In various embodiments the law enforcement investigator accesses the software or Internet service of the present technology and reviews the results of the algorithm. In some instances the results are a set of graphical transaction chains that illustrate the flow of crypto currency through addresses and transactions, with identifiable information. In some instances the results are a spreadsheet of a transaction chain listing the transaction flow with amounts, dates and times along with related addresses.

In various embodiments of the present technology the law enforcement investigator sees that an address in question sent money over a six month period to an address that is at a bitcoin exchange or retailer, which can be served a subpoena to gain actual identity information, which is used as evidence for criminal prosecution or for a civil case.

In various embodiments of the present technology the law enforcement investigator sees that some portion of currency flowing from an address being searched is also being received by an address that is being investigated by another investigator. This may help uncover the funds flow between one criminal on the East coast importing drugs, and a trafficker on the West coast purchasing those drugs and selling them in their local city. Without the present technology, this would be done manually and the relationships, which could take months of manual investigation, or will not be discovered at all.

FIG. 1 illustrates a transaction chain graph 100 showing crypto currency flows that are difficult to understand and requires manual investigation to identify a known address. FIG. 1 shows the transaction chain graph 100 that is difficult to identify a known address in contrast to FIG. 2.

Figure 2:
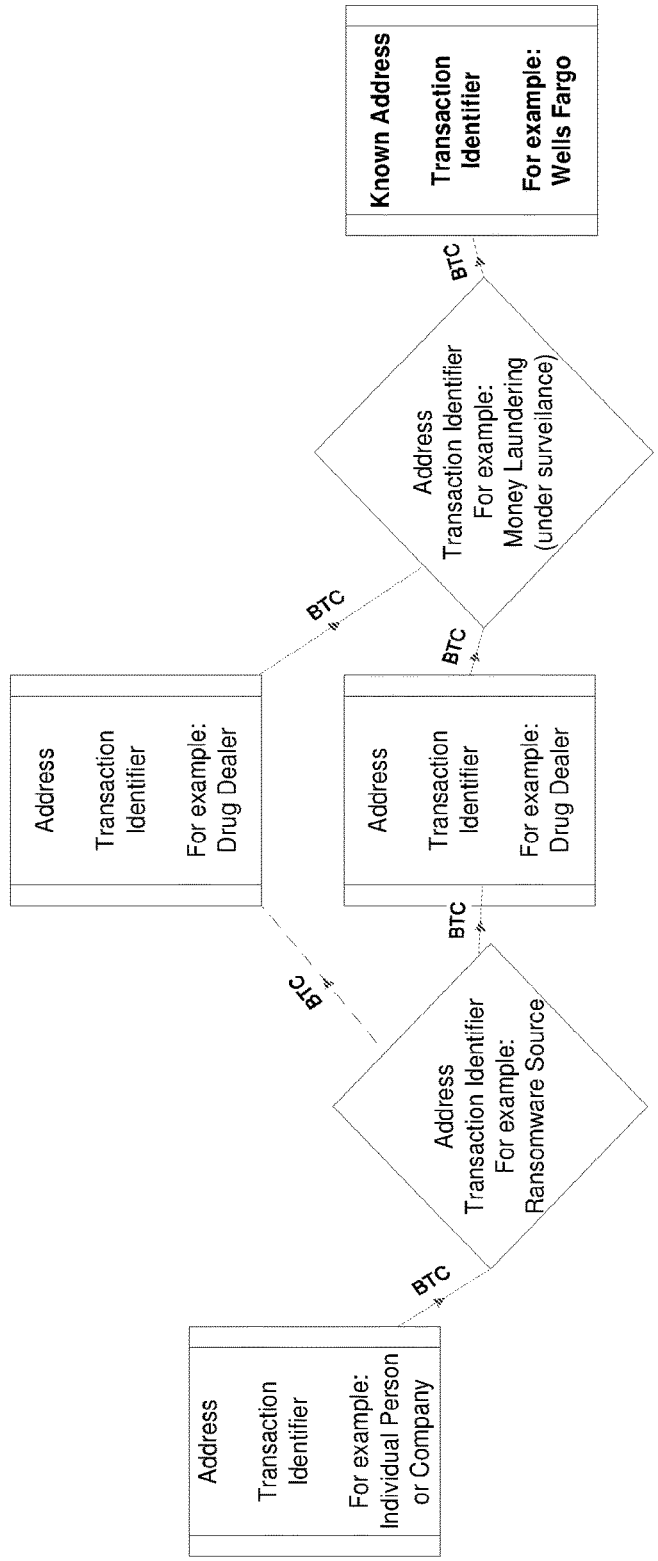
FIG. 2 illustrates an identifiable transaction chain graph showing crypto currency flows that are easy to understand and ends with identifiable information according to embodiments of the present technology.

FIG. 2 illustrates an identifiable transaction chain graph 200 showing crypto currency flows that are easy to understand and ends with identifiable information according to embodiments of the present technology. FIG. 2 shows the identifiable transaction chain graph 200 that has the same data as the transaction chain graph 100 of FIG. 1 but the irrelevant data has been removed according to embodiments of the present technology. The identifiable transaction chain graph 200 illustrates how automated algorithms of the present technology automatically find virtual currency flows that end in addresses with identifiable information (e.g., a known address).

Figure 3:
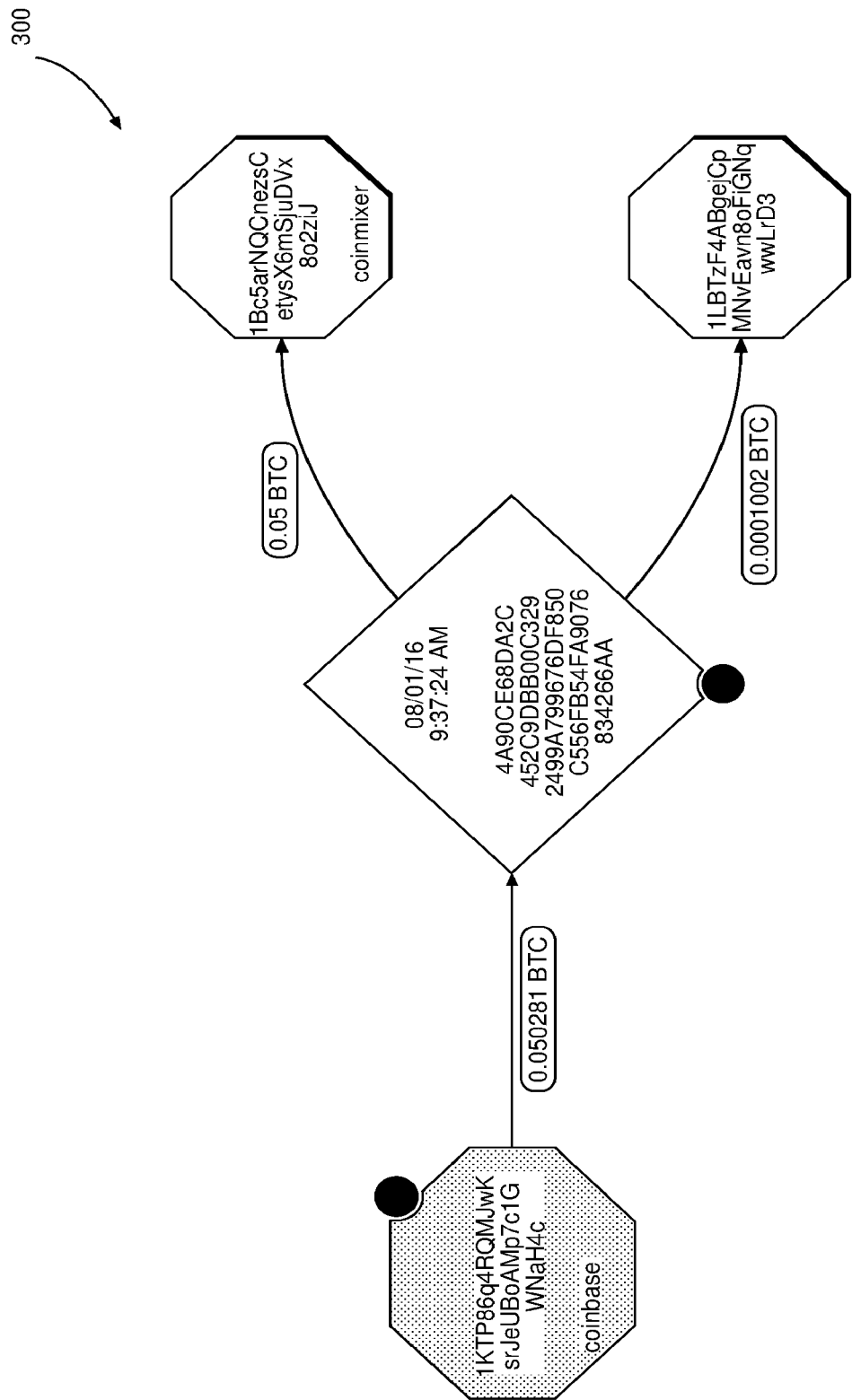
FIG. 3 depicts a flow transaction chain graph showing crypto currency flowing into an identified anonymization service where transaction tracing of this particular flow automatically stops according to embodiments of the present technology.

FIG. 3 depicts a flow transaction chain graph 300 showing crypto currency flowing into art identified anonymization service where transaction tracing of this particular flow automatically stops according to embodiments of the present technology. The flow transaction chain graph 300 includes visual icons (i.e., shaded dots) on addresses and transactions that comprise identifiable information. For example, a lightly shaded dot (e.g., a yellow dot) indicates that an address is being investigated by another agent.

Embodiments of the present technology provide systems and methods for performing automated investigations of crypto currencies, providing investigators a list of transaction chains that can lead to efficient investigations with identifiable information on the ends of transaction chains.

Embodiments of the present technology provide systems to visualize transaction chains to generate transaction chains showing crypto currency flows both forward and backward in time, allowing investigators to see where currency is sent, and where it was sent from. In some instances a transaction chain is to remove or prune transaction paths that are not directly relevant to an actionable investigation. In various instances methods bound automated transaction searching to prevent the algorithm from running without ever stopping and consuming excessive computing power.

Various embodiments of the present technology include classification of identifiable information and associating the identifiable information with crypto currency addresses, address clusters, and transactions in order to detect actionable transaction chains, and to bound automated searching.

Figure 4:
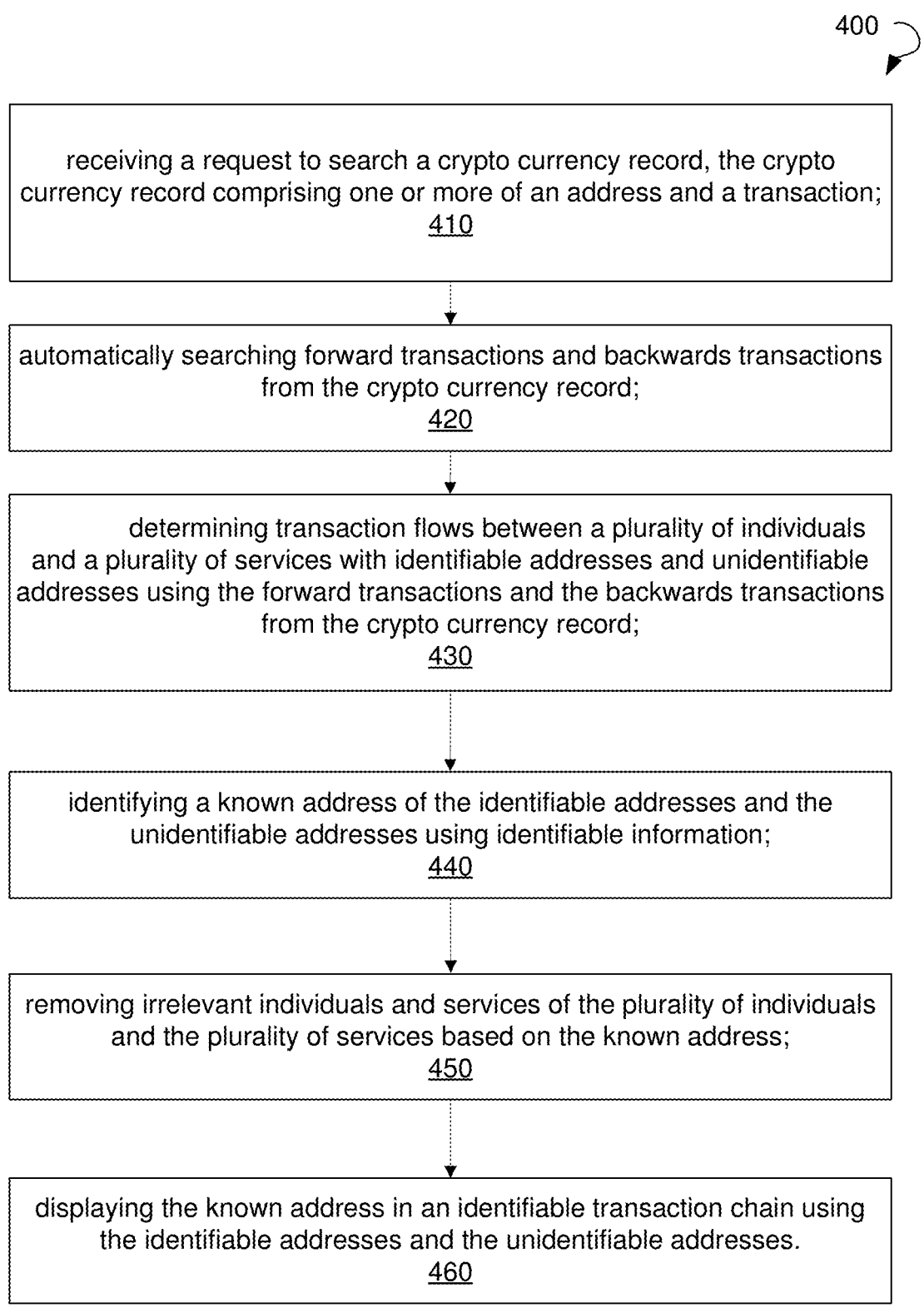
FIG. 4 depicts a process flow diagram according to embodiments of the present technology.

FIG. 4 depicts a process flow diagram showing according to embodiments of the present technology. FIG. 4 is a process flow diagram showing a method 400 for displaying the known address in an identifiable transaction chain using the identifiable addresses and the unidentifiable addresses. The method 400 may be performed by processing logic that may comprise hardware (e.g., dedicated logic, programmable logic, and microcode), software (such as software run on a general-purpose computer system or a dedicated machine), or a combination thereof.

As shown in FIG. 4, the method 400 may commence at operation 410, with receiving a request to search a crypto currency record, the crypto currency record comprising one or more of an address and a transaction.

At operation 420, the method 400 may proceed with automatically searching forward transactions and backwards transactions from the crypto currency record.

At operation 430, the method 400 may include determining transaction flows between a plurality of individuals and a plurality of services with identifiable addresses and unidentifiable addresses using the forward transactions and the backwards transactions from the crypto currency record.

At operation 440, the method 400 may proceed with identifying a known address of the identifiable addresses and the unidentifiable addresses using identifiable information.

At operation 450, the method 400 may include removing irrelevant individuals and services of the plurality of individuals and the plurality of services based on the known address.

At operation 460, the method 400 may proceed with displaying the known address in an identifiable transaction chain using the identifiable addresses and the unidentifiable addresses.

Figure 5:
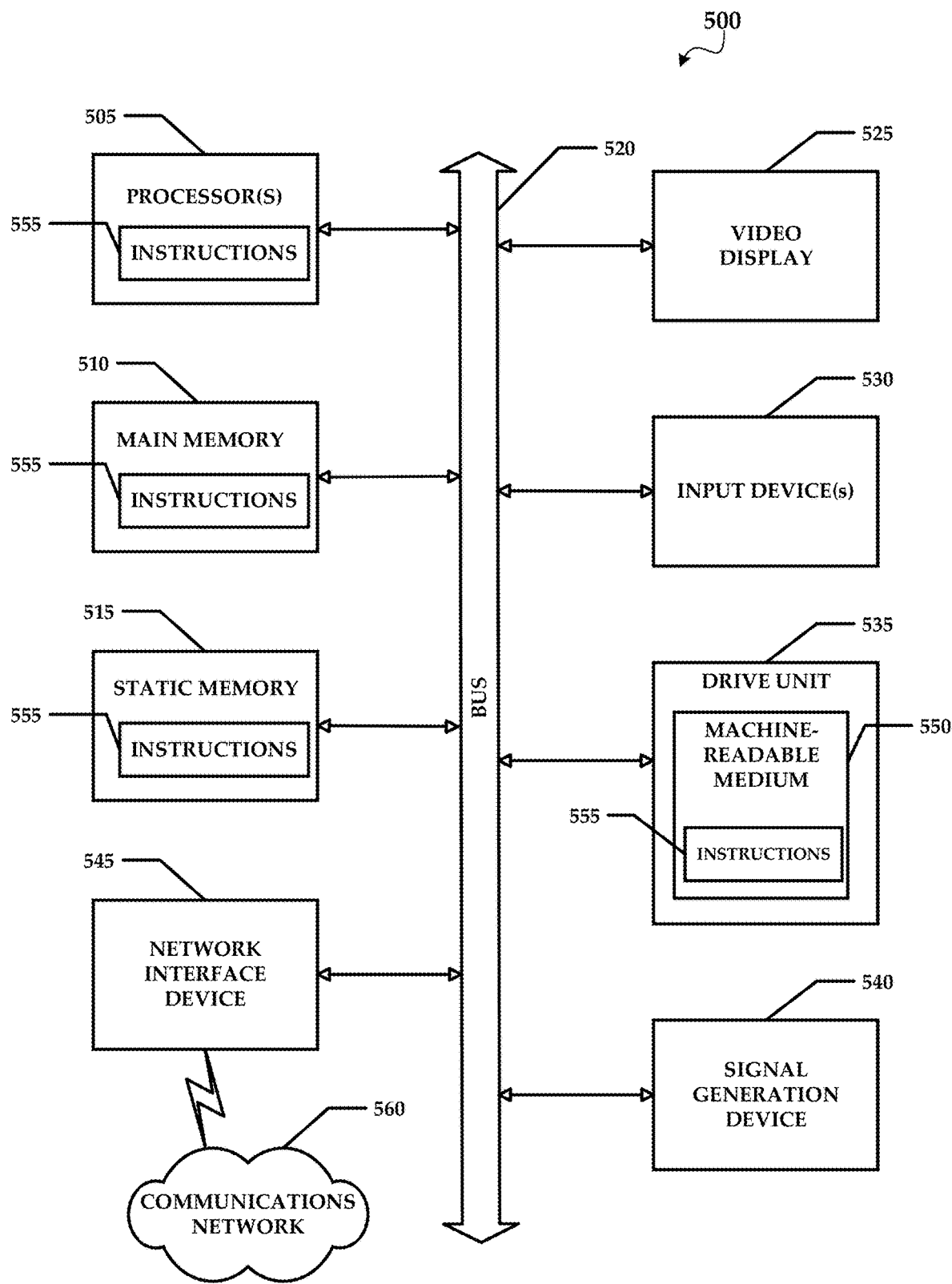
FIG. 5 illustrates an exemplary computer system that may be used to implement embodiments of the present technology.

FIG. 5 illustrates an exemplary computer system that may be used to implement embodiments of the present technology. FIG. 5 shows a diagrammatic representation of a computing device for a machine in the example electronic form of a computer system 500, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a server, a client machine in a server-client network environment, or as a peer machine in a peer-to-peer (or distributed) network environment. The machine can be a personal computer (PC), tablet PC, game console, set-top box (STB), personal digital assistant (PDA), television device, cellular telephone, portable music player (e.g., a portable hard drive audio device), web appliance, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein.

The example computer system 500 includes a processor or multiple processor(s) 505 (e.g., a central processing unit (CPU), a graphics processing unit (GPU), or both), and a main memory 510 and a static memory 515, which communicate with each other via a bus 520. The computer system 500 can further include a video display unit 525 (e.g., a liquid-crystal display (LCD), organic light emitting diode (OLED) display, or a cathode ray tube (CRT)). The computer system 500 also includes at least one input device 530, such as an alphanumeric input device (e.g., a keyboard), a cursor control device (e.g., a mouse), a microphone, a digital camera, a video camera, and so forth. The computer system 500 also includes a disk drive unit 535, a signal generation device 540 (e.g., a speaker), and a network interface device 545.

The drive unit 535 (also referred to as the disk drive unit 535) includes a machine-readable medium 550 (also referred to as a computer-readable medium 550), which stores one or more sets of instructions and data structures (e.g., instructions 555) embodying or utilized by any one or more of the methodologies or functions described herein. The instructions 555 can also reside, completely or at least partially, within the main memory 510, static memory 515 and/or within the processor(s) 505 during execution thereof by the computer system 500. The main memory 510, static memory 515, and the processor(s) 505 also constitute machine-readable media.

The instructions 555 can further be transmitted or received over a communications network 560 via the network interface device 545 utilizing any one of a number of well-known transfer protocols (e.g., Hyper Text Transfer Protocol (HTTP), CAN, Serial, and Modbus). The communications network 560 includes the Internet, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, Digital Subscriber Line (DSL) connection, Ethernet connection, Integrated Services Digital Network (ISDN) line, cable modem, Asynchronous Transfer Mode (ATM) connection, or an Fiber Distributed Data Interface (FDDI) or Copper Distributed Data Interface (CDDI) connection. Furthermore, communications network 560 can also include links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network.

While the machine-readable medium 550 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, the technology for automatically searching crypto currency transaction paths for a transaction chain with an identifiable address is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method comprising:
   receiving, at a server, a request from a first investigator client device to search a crypto currency record, wherein the request comprises a transaction restriction for searching the crypto currency record and identifiable information associated with the crypto currency record, wherein the identifiable information comprises a blockchain payment address, a transaction, or both;
   in response to receiving the request, automatically searching, by the server, forward transactions and backwards transactions in a distributed blockchain from either or both of the blockchain payment address and the transaction of the crypto currency record according to the transaction restriction, wherein the transaction restriction includes a time period restriction, and a transaction value range restriction for the forward transactions and the backwards transactions, the transaction restriction reducing a number of transactions searched for when automatically searching the forward transactions and the backwards transactions;
   creating, by the server, as a result of the automatically searching, an identifiable transaction chain comprising a list of addresses with associated transaction identifiers;
   analyzing, by the server, the identifiable transaction chain to determine transaction flows for a plurality of individuals and a plurality of services of the forward transactions and the backwards transactions from the crypto currency record;
   determining, in the transaction flows, addresses or transactions having the identifiable information, wherein the addresses and the transactions are represented in the distributed blockchain, and wherein at least one address or at least one transaction comprises information identifying the at least one address or the at least one transaction that is being researched by another investigator;
   transmitting, by the server to the first investigator client device, the identifiable transaction chain and the addresses or transactions having the identifiable information; and
   displaying, at the first investigator client device, the identifiable transaction chain as a flow transaction chain graph, the addresses or transactions being displayed as visual icons in the flow transaction chain graph, and visually differentiating, based on the information identifying the at least one address or the at least one transaction that is being searched by the other investigator, a portion of the visual icons for the addresses or transactions that are being researched by the other investigator from another portion of the visual icons for the addresses or transactions that are not being researched by the other investigator.

2. The method as recited in claim 1, wherein the crypto currency record further comprises one or more of: a time stamp, a value amount being transacted, a list of one or more senders of funds for the value amount being transacted, and a list of one or more receivers of funds for the value amount being transacted.

3. The method as recited in claim 1, wherein the identifiable information further comprises one or more of: identification data about at least one of an owner and an operator of a payment address, a cluster identifier associated with one or more addresses, identification data of a payment service associated with an address, identification data of one or more of a gambling site and service, identification data of an anonymization service, identification data of a crypto currency retailer, identification data of a potential criminal actor, and identification data of an online account associated with one or more of the address and the transaction.

4. The method as recited in claim 1, wherein the identifiable information comprises: an Internet location indicating where at least one of the address and the transaction is associated.

5. The method as recited in claim 4, wherein the Internet location indicating where at least one of the address and the transaction is associated comprises one or more of: data identifying general website data, data identifying a social media website, and data identifying a dark web market where at least one of the address and the transaction is associated.

6. The method as recited in claim 1, wherein the transaction restriction reduces computing power used when automatically searching the forward transactions and the backwards transactions.

7. The method as recited in claim 1, further comprising: upon determining the addresses or transactions having the identifiable information, notifying the first investigator client device that search results for the request are available.

8. The method as recited in claim 1, further comprising: providing a list of transaction chains that terminate with an identifiable address or transaction.

9. The method as recited in claim 1, further comprising: storing the identifiable transaction chain in a cloud-based normative data storage database.

10. The method as recited in claim 9, further comprising: accessing the cloud-based normative data storage database having normative data for the identifiable transaction chain, risk ratios, and recommendations;
comparing the addresses or transactions having identifying information to the normative data for the identifiable transaction chain, risk ratios, and recommendations;
and based on the comparing, selecting a recommendation of the recommendations accessed from the cloud-based normative data storage database.

11. A system comprising:
a server comprising at least one processor; and
a memory storing processor-executable instructions, wherein the at least one processor is configured to implement the following operations upon executing the processor-executable instructions:
receiving a request from a first investigator client device to search a crypto currency record, wherein the request comprises a transaction restriction for searching the crypto currency record and identifiable information associated with the crypto currency record, wherein the identifiable information comprises a blockchain payment address, a transaction, or both;
in response to receiving the request, automatically searching forward transactions and backwards transactions in a distributed blockchain from either or both of the blockchain payment address and the transaction of the crypto currency record according to the transaction restriction, wherein the transaction restriction includes a time period restriction, and a transaction value range restriction for the forward transactions and the backwards transactions, the transaction restriction reducing a number of transactions searched for when automatically searching the forward transactions and the backwards transactions;
creating, as a result of the automatically searching, an identifiable transaction chain comprising a list of addresses with associated transaction identifiers;
analyzing the identifiable transaction chain to determine transaction flows for a plurality of individuals and a plurality of services of the forward transactions and the backwards transactions from the crypto currency record;
determining, in the transaction flows, addresses or transactions having the identifiable information, wherein the addresses and the transactions are represented in the distributed blockchain, and wherein at least one address or at least one transaction comprises information identifying the at least one address or the at least one transaction that is being researched by another investigator;
transmitting, to the first investigator client device, the identifiable transaction chain and the addresses or transactions having the identifiable information; and
displaying, at the first investigator client device, the identifiable transaction chain as a flow transaction chain graph, the addresses or transactions being displayed as visual icons in the flow transaction chain graph, and visually differentiating, based on the information identifying the at least one address or the at least one transaction that is being searched by the other investigator, a portion of the visual icons for the addresses or transactions that are being researched by the other investigator from another portion of the visual icons for the addresses or transactions that are not being researched by the other investigator.

12. The system as recited in claim 11, wherein the crypto currency record further comprises one or more of a time stamp, a value amount being transacted, a list of one or more senders of funds for the value amount being transacted, and a list of one or more receivers of funds for the value amount being transacted.

13. The system as recited in claim 11, wherein the identifiable information further comprises one or more of: identification data about at least one of an owner and an operator of a payment address, a cluster identifier associated with one or more addresses, identification data of a payment service associated with an address, identification data of one or more of a gambling site and service, identification data of an anonymization service, identification data of a crypto currency retailer, identification data of a potential criminal actor, and identification data of an online account associated with one or more of the address and the transaction.

14. The system as recited in claim 11, wherein the identifiable information comprises: an Internet location indicating where at least one of the address and the transaction is associated.

15. The system as recited in claim 14, wherein the Internet location indicating where at least one of the address and the transaction is associated comprises one or more of: data identifying general website data, data identifying a social media website, and data identifying a dark web market where at least one of the address and the transaction is associated.

16. The system as recited in claim 11, wherein the transaction restriction reduces computing power used when automatically searching the forward transactions and the backwards transactions.

17. The system as recited in claim 11, wherein the at least one processor is further configured to implement operations of: upon determining the addresses or transactions having the identifiable information, notifying the first investigator client device that search results for the request are available.

18. The system as recited in claim 11, wherein the at least one processor is further configured to implement the operations of: providing a list of transaction chains that terminate with an identifiable address or transaction.

19. The system as recited in claim 11, wherein the at least one processor is further configured to implement the operations of: storing the identifiable transaction chain in a cloud-based normative data storage database;
   accessing the cloud-based normative data storage database having normative data for the identifiable transaction chain, risk ratios, and recommendations;
   comparing the addresses or transactions having identifying information to the normative data for the identifiable transaction chain, risk ratios, and recommendations;
   and based on the comparing, selecting a recommendation of the recommendations accessed from the cloud-based normative data storage database.

20. A non-transitory computer readable medium having embodied thereon instructions being executable by at least one processor to perform a method, the method comprising:
   receiving, at a server, a request from a first investigator client device to search a crypto currency record, wherein the request comprises a transaction restriction for searching the crypto currency record and identifiable information associated with the crypto currency record, wherein the identifiable information comprises a blockchain payment address, a transaction, or both;
   in response to receiving the request, automatically searching, by the server, forward transactions and backwards transactions in a distributed blockchain from either or both of the blockchain payment address and the transaction of the crypto currency record according to the transaction restriction, wherein the transaction restriction includes a time period restriction, and a transaction value range restriction for the forward transactions and the backwards transactions, the transaction restriction reducing a number of transactions searched for when automatically searching the forward transactions and the backwards transactions;
   creating, by the server, as a result of the automatically searching, an identifiable transaction chain comprising a list of addresses with associated transaction identifiers;
   analyzing, by the server, the identifiable transaction chain to determine transaction flows for a plurality of individuals and a plurality of services of the forward transactions and the backwards transactions from the crypto currency record;
   determining, by the server, in the transaction flows, addresses or transactions having the identifiable information, wherein the addresses and the transactions are represented in the distributed blockchain, and wherein at least one address or at least one transaction comprises information identifying the at least one address or the at least one transaction that is being searched by another investigator;
   transmitting, by the server to the first investigator client device, the identifiable transaction chain and the addresses or transactions having the identifiable information; and
   displaying, at the first investigator client device, the identifiable transaction chain as a flow transaction chain graph, the addresses or transactions being displayed as visual icons in the flow transaction chain graph, and visually differentiating, based on the information identifying the at least one address or the at least one transaction that is being searched by the other investigator, a portion of the visual icons for the addresses or transactions that are being searched by the other investigator from another portion of the visual icons for the addresses or transactions that are not being researched by the other investigator.

* * * * *